United States Patent [19]

Womack

[11] 4,261,582
[45] Apr. 14, 1981

[54] ROTARY MECHANICAL SHAFT SEAL ASSEMBLY

[76] Inventor: Morris F. Womack, Box 26127, Houston, Tex. 77032

[21] Appl. No.: 721,944

[22] Filed: Sep. 10, 1976

[51] Int. Cl.³ .............................................. F16J 15/34
[52] U.S. Cl. ...................................................... 277/91
[58] Field of Search ........................ 277/81, 91, 93 SD

[56] References Cited

U.S. PATENT DOCUMENTS

| 3,101,200 | 8/1963 | Tracy | 277/81 |
| 3,926,442 | 12/1975 | Müller | 277/91 |

*Primary Examiner*—Robert I. Smith
*Attorney, Agent, or Firm*—Browning, Bushman & Zamecki

[57] ABSTRACT

A mechanical seal assembly for sealing between a rotating shaft and a housing wall through which it passes with the mutually engageable rotating and stationary sealing surfaces being located in a radial plane with respect to the axis of the rotating shaft and said sealing surfaces being carried by sealing members on the shaft and wall respectively. The sealing member carried on the shaft is mounted on an anchoring member anchored to the shaft, and is telescopingly engaged with the anchoring member so as to rotate with the shaft at all times and be movable toward the stationary sealing surface to sealingly engage the same. This provides the primary seal. There are seals provided also between the anchoring member on the shaft and the shaft inself, and between the anchoring member on the shaft and the rotating sealing member that is telescopingly engaged therewith, one of these seals at least being in the form of two axially spaced O-rings. These O-rings serve the purpose of exerting a substantial and constant force to prevent cocking and insure alignment of the parts between which they seal relative to one another. The O-ring and O-ring groove nearest the primary seal and the entrapped air space between the two O-rings creates a thermal barrier that protects the other O-ring of the same pair from excessive heat and resulting deterioration.

1 Claim, 4 Drawing Figures

ROTARY MECHANICAL SHAFT SEAL ASSEMBLY

BACKGROUND OF THE INVENTION

1. Field of the Invention

This invention relates to a mechanical seal for sealing a shaft with respect to a housing or the like from which it extends and is customarily employed in connection with rotary machines such as centrifugal pumps, turbines, and the like. An example of a seal for this general purpose is disclosed in U.S. Pat. No. 3,198,530 issued to E. W. Conklin on Aug. 3, 1965.

In general this type of seal employs a stationary sealing member known as an insert, carried by the wall and surrounding the shaft. The insert provides a radially extending planar sealing surface relative to the axis of the shaft. Another member which is rigidly secured to the shaft, herein called an anchoring member, surrounds the shaft at a short distance from the insert and rotates with the shaft without any longitudinal movement on the shaft. A third member, herein called a rotary sealing member, is telescopingly engaged with the member anchored on the shaft and has an end surface in the form of a planar sealing surface. The third member is adapted to move endwise relative to the anchoring member until it is in sealing engagement with the sealing surface on the insert. This sealing engagement provides the primary seal between stationary and rotating parts.

The last mentioned sealing member may be moved longitudinally into sealing engagement by means of spring means or the like, or by means of the pressure sealed against, or by a combination thereof. It is intended to be held in alignment with the shaft by telescoping engagement with the member anchored on the shaft, and means is provided between the two members for driving the third member to rotate with the shaft. Separate seals, herein may be called secondary seals, may be provided between the member anchored on the shaft and the shaft itself and between the member anchored on the shaft and the third member which moves longitudinally relative thereto into sealing engagement. Since there is no movement between the anchored member and the shaft, the secondary seal between them is called a "static" seal. There being a slight axial movement between the anchored and movable members, the secondary seal between them is called a "dynamic" seal.

2. Description of the Prior Art

Various types of seals have been employed between the member rigid on the shaft and the shaft itself on the one hand and between such member rigid on the shaft and the movable sealing member telescopingly engaged therewith. One example of such a seal is shown in the Conklin U.S. Pat. No. 3,198,530 above cited. However, in the case of the Conklin patent the seal between the anchored member and the shaft and that between the anchored member and the movable member are the same and in effect the seal is provided directly between the shaft and the movable member.

The problem of providing an adequate seal with the V-type sealing members illustrated in this patent is several-fold, but perhaps most importantly lies in the fact that in order to make such seals effective it is essential to spread the lips of the seal with such force as to induce a considerable frictional engagement with the movable sealing member and hence to prevent it from being moved freely into sealing engagement with the insert. It is essential that the movable member be movable freely so that a means providing a specified sealing force may be fully effective at all times in maintaining a predetermined desired sealing pressure between the two sealing members. Excessive frictional resistance by high friction type of sealing rings or the like may serve to substantially reduce the sealing pressure between the two sealing members and cause them to fail to maintain an adequate seal therebetween. Furthermore, during operation, if, as almost invariably occurs, to some slight degree, the fixed sealing surface plane varies even minutely from a true radial plane, it is necessary for the rotating sealing member to tilt slightly or cock over to a position at a slight angle to a true coaxial position with the shaft, in order to fully seat against the stationary planar surface. Then when the shaft rotates this sealing member must gyrate slightly relative to the shaft. High friction type seal rings, such as the V-type of Conklin, can interfere with such gyration sufficiently to cause excessive wear of the seal surfaces and various other parts of the assembly and cause early seal failure either of the seal ring or of the engagement between the rotating and stationary seal members.

In an effort to provide a seal between the anchoring member rigid on the shaft and the movable sealing member movable relative thereto, as well as between the member rigid on the shaft and the shaft itself, without introducing such excessive friction, the use of O-ring seals in these positions has been practiced. It is well known that O-ring seals introduce a minimum of friction between two relatively movable parts between which they provide what is called a dynamic seal, especially where such movement between the parts is longitudinal. However, certain unexpected difficulties have been encountered in using such O-ring seals as dynamic secondary seals.

One great difficulty encountered is that when a movable part such as the movable sealing member is sealed to another member with which it is in telescoping engagement, with the O-ring surrounding one member and lying within the other, any slight tilting or cocking of the members relative to one another is in no substantial sense resisted by the action of the O-ring, which merely engages the tilting member at diametrically opposite positions and any force it exerts on the tilting member is exerted on opposite ends of a diameter in directions directly opposed to one another. The result is that any cocking or tilting that occurs tends to remain, with the result that the sealing qualities of the O-ring are shortly subjected to deterioration.

Another difficulty with such an O-ring seal as a secondary seal is that the secondary seal is normally fairly closely situated to the primary sealing surface of the movable sealing member where it engages the stationary primary sealing surface of the insert, at which point, under high speeds of rotation, a great deal of heat is generated by the friction between the primary sealing surfaces. This heat causes a great rise in temperature and this heat so generated flows through the material of the movable sealing member and increases very substantially the temperature of the O-ring. The O-rings are necessarily resilient and are normally constructed of a material which will deteriorate much more rapidly under high temperatures than at low temperatures. Also, the rate of deterioration is not directly proportional to the temperature. For example, deterioration at 350° F. might be twice as much as that at 300° F.

It has also been observed that in the case of use of a single O-ring dynamic seal between the anchored member on the shaft and the movable member thereon, an erosion or fretting takes place in the vicinity of the O-ring along the surface of the anchored member. This of course damages the anchored member, and, while the damage may not be of such a critical nature as to cause failure in most cases, it can be the cause of having to work on or replace the anchored member if the erosion becomes too great.

It has also been found that a single O-ring does not provide sufficient friction in a rotary direction to transmit the torque which may be required to rotate the movable sealing member with the shaft, and various mechanical means are provided for this purpose. In some cases, for example, a single ring-like spring is employed for urging the movable sealing member toward the stationary sealing member and this spring will assist the O-ring in transmitting sufficient torque to rotate the movable sealing member.

SUMMARY OF THE INVENTION

It is an object of this invention to provide a dynamic secondary seal between an anchoring member a longitudinally movable sealing member in a seal arrangement of the general type above described, and also a static secondary seal between the anchoring member and the shaft on which it is anchored, of such a character that the difficulties above described in connection with the prior devices of this character will be solved.

Specifically it is an object to employ a seal which will definitely provide a deterrent to the cocking of the movable seal member with respect to the shaft and anchored member, and intended to urge it back to alignment every time it is cocked. Another object is to provide such a seal between the anchored and movable members in which the sealing material of at least part of the seal is shielded against extreme degrees of temperature resulting from the rubbing of the rotating sealing surface against the stationary sealing surface of the primary seal.

It is a further object to provide such a seal which will eliminate the fretting or erosion between dynamic parts, such as takes place where a single O-ring seal is employed between the anchoring member and the movable member.

Another object is to provide such a seal in which the resilient means that provides the seal will also provide sufficient frictional drive to keep the longitudinally movable sealing member rotating with the shaft. Another object is to use aligning means between the anchored member and the rotating sealing member so as to mechanically maintain exact phase relation between these two without necessity for the aligning means to transmit the torque necessary to rotate the movable sealing member.

It has been found that two parallel longitudinally spaced O-rings, instead of the single O-ring which has been employed in the prior art, provides unexpectedly a complete solution of the difficulties enumerated.

The use of two such parallel spaced O-rings provides a structure which, when one member becomes slightly cocked or misaligned with respect to the other, compresses one O-ring on one side of the structure and the other O-ring on the other side of the structure and since these are spaced apart longitudinally the result is a pair of forces forming a couple tending at all times to rectify the alignment of the two members. This has been proven very effective.

It has further been found that when two such O-rings are provided and mounted on the rotating longitudinally movable seal member, which is usually in the form of a thin sleeve at the location of the dynamic secondary seal, the groove cut in the seal member to accomodate the O-ring that is closest to the relatively movable primary sealing faces of the sealing members, will serve as a heat barrier to prevent the rapid transfer of heat along the movable sealing member and thus to screen the more remote of the two O-rings of the dynamic secondary seal from such heat. Thus only one of the O-rings will be subjected to a high degree of heat coming from the rubbing primary sealing surfaces and the O-rings have been found to last a great deal longer under these circumstances, sometimes up to nine and ten times as long as when only a single O-ring seal is used.

Referring now to the drawings, there is illustrated a certain preferred embodiment of the invention. It will be understood that this is for the purpose of illustration and example only and not by way of limitation.

DESCRIPTION OF THE PREFERRED EMBODIMENT

Figure 1:
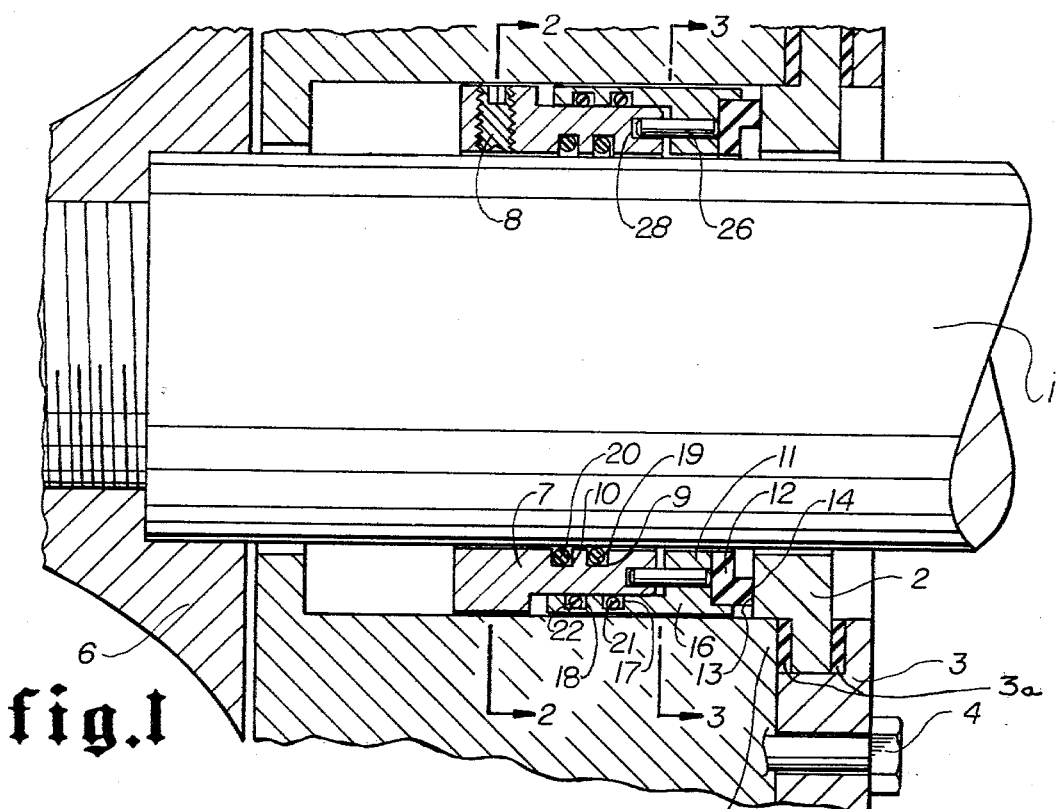
FIG. 1 is a view in longitudinal cross section showing a seal assembly in accordance with this invention in surrounding relation with respect to a rotating shaft and in engagement with a non-rotating seal insert carried by the housing.
Figure 2:
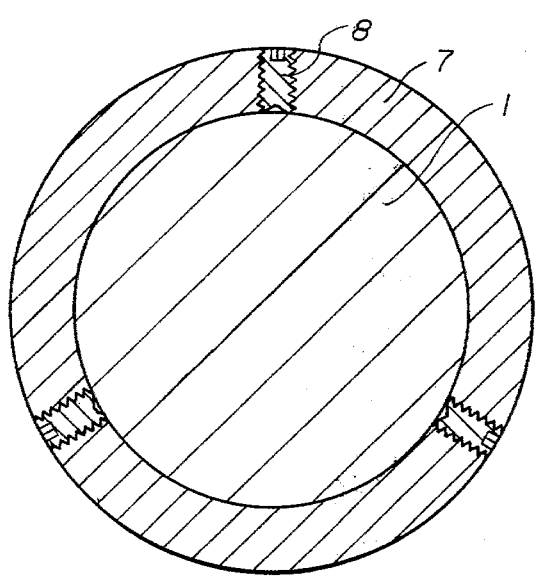
FIG. 2 is a transverse cross section taken along the line 2—2 of FIG. 1 and showing the set screws by which the portion of the seal assembly that is anchored to the shaft is secured.

This preferred embodiment of the invention is illustrated in place to form a seal about the shaft 1 as it passes through the stationary wall of a housing or the like.

The stationary sealing member is shown at 2, held in place by a clamping ring 3 secured by bolts or cap screws 4 to a housing 5. Suitable gasket material 3a is employed to seal between the housing 5 and the ring 3 on the one hand and the stationary sealing member 2 on the other hand.

In the illustration shown in the drawing, the shaft 1 carries an impeller 6 or other type of rotor depending upon the type of machine that may be in use.

The seal assembly which embodies the present invention comprises an anchoring ring 7 surrounding the shaft 1 at a short distance from the stationary sealing member 2 and secured by means of three Allen-head set screws 8 or the like to the shaft so as to be rigidly mounted thereon. This anchoring ring is sealed to the shaft to prevent leakage through the ring along the shaft by the provision of two axially spaced grooves 9 and 10 in its inner surface for the purpose of receiving O-rings later to be described.

Telescopingly engaging the outer surface of the anchoring ring 7 and having an inner flange extending radially into proximity with the outer surface of the shaft 1 is a longitudinally movable sealing member 11 having a rotary seal ring 12 carried at its end closest to the stationary sealing member 2, and provided on its face opposed to the stationary sealing member 2 with a primary sealing surface 13. The sealing member 2 in its turn has a primary sealing surface 14 opposed to the sealing surface 13.

Both of the sealing surfaces 13 and 14 are planar and are disposed in a plane which is truly radial with respect to the axis of the shaft 1, within feasible tolerances. These sealing surfaces are lapped to each other so as to form a leak-proof seal when they are in contact. The rotary sealing ring 12 may be of any suitable material, some materials used for such part being carbon, tungsten-carbide, glass filled tetrafluorethylene and polytetrafluorethylene. The fixed sealing member 2 would likewise be made of a suitable well-known material compatable with employed for the sealing member 12, materials known to be useful for this purpose including tungsten-carbide and ceramic material.

The movable sealing member body 11 is counterbored to form a recepticle for the rotary sealing ring 12, so as to retain it centered with respect to the body 11 of the movable sealing member.

The body of the movable sealing member likewise has a sleeve-like portion 16 extending in the opposite direction from the primary seal and it is this sleeve-like portion 16 which slidingly engages over the outside of the anchoring member 7. The fit between these parts is of such a character as to maintain the movable sealing member 11 in as close alignment as feasible with the anchoring member 7 without interfering with its axial movement relative to the member 7.

Formed in the inner surface of the sleeve-like part 16 are two O-ring grooves 17 and 18 respectively which are parallel to one another and spaced axially from one another. These grooves are of such a depth as to extend a major portion of the distance through the thickness of the sleeve 16 for the reason presently to be explained.

Located in the grooves 9 and 10 in the anchoring member 7 are a pair of O-ring seals 19 and 20 respectively which provide a static secondary seal between the anchoring member 7 and the exterior surface of the shaft 1. Likewise, located in the grooves 17 and 18 in the sleeve 16 are a pair of O-ring seals 21 and 22 respectively which provide a dynamic secondary seal between the sleeve 16 and the exterior surface of the anchoring member 7.

The endwise facing surface of the inwardly extending flange-like part of the movable sealing member 11 is provided with a considerable number of holes 23 spaced about its circumference for the purpose of receiving coiled springs 24, the opposite ends of which bear against the anchoring member 7 and thus constantly urge the movable sealing member 11 toward engagement of its axially facing primary sealing surface 13 with the oppositely facing sealing surface 14 of the member 2. There are actually 16 holes illustrated in this flange of the member 11. Four of them, equally spaced about the circumference are designated 25 and receive dowel pins 26 which form a driving, phase-maintaining connection between the members 7 and 11.

Figure 3:
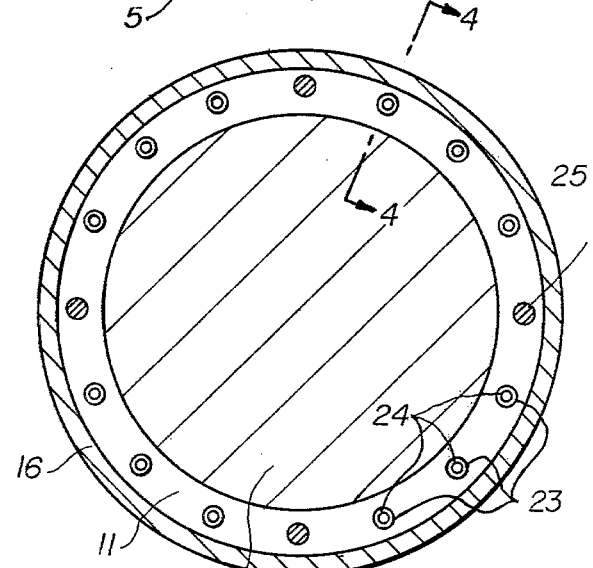
FIG. 3 is a view transverse to the axis of the shaft taken along the line 3—3 of FIG. 1.
Figure 4:
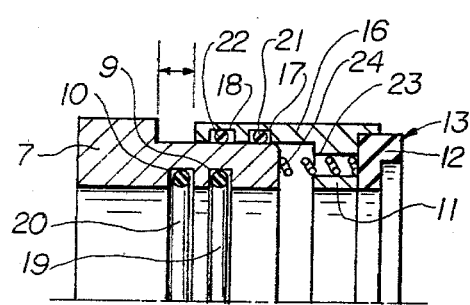
FIG. 4 is a view similar to the upper portion of FIG. 1 but showing the upper portion of the seal assembly without the shaft in a section along the line 4—4 of FIG. 3.

The adjacent end of the anchoring member 7 is provided with an equal number of holes 28 to the holes 25 and in register therewith. Each of the holes 28 receives an end of one of the dowel pins 26 extending from one of the holes 25. By reference to FIG. 3 it will be seen that there are 16 of the holes 23 and 25 altogether, and that these in this embodiment are equally spaced about the circumference of the member 11. The holes 25, equally spaced about the circumference receive the pins 26, and all of the remainder of the holes 23 and 25 receive the springs 24. Thus the springs 24 will appear in groups of 3 adjacent to one another and then a next hole on each side of the group of three will receive one of the pins 26. This grouping of springs and pins is not critical as on some occasions there might be no necessity for so many springs and a necessity for more pins, or vice versa. It is however, highly desirable that the holes receiving the pins and those receiving the springs be balanced about the circumference, so that the springs for example will not tend to cause any cocking of the movable sealing member 11 relative to the anchoring of member 7, and so that the guidance provided by the dowel pins 26 will likewise be balanced about the circumference.

In the case of both sets of parallel O-rings, 19 and 20, and 21 and 22, the arrangement provides axially spaced resilient supports each of which extends throughout the circumference of the parts between which the O-rings are placed. Any tendency to cock one of the members between which the rings are placed with respect to the other tends to compress one of the O-rings on one side of the circumference and the other of the O-rings on the opposite side. The natural tendency of the O-rings to resume their normal shape then produces a pair of forces in the form of a couple tending to restore the alignment of the parts. Thus the pair of parallel O-rings provides a structure which constantly exerts a tendency to maintain the alignment of the parts and prevent their cocking, as well as to return them to alignment if they are forcibly cocked relative to one another. For this reason it will be seen that the two inner seal rings 19 and 20 assist materially in aligning the anchoring member 7 with the shaft so that when the set screws 8 are tightened it will be in as close alignment as possible and of course maintained in such alignment by the set screws 8.

In the case of the outer O-rings which are mounted in the grooves 17 and 18 of the sleeve on the movable sealing member 11, they likewise provide a couple tending to maintain the alignment of the movable sealing member 11 with the fixed anchoring member 7. Inevitably some lack of absolute precision will cause the sealing surface on the stationary sealing member 2 to vary slightly from an exact radial plane relative to the axis of the shaft 1, or the alignment of the anchoring member 7 and the movable sealing member 11 with the axis of the shaft 1 will be slightly inaccurate, so that when the two sealing surfaces 13 and 14 are forced into engagement by the springs 24, there may be some slight cocking of the movable sealing member 11 with respect to the anchoring member 7 and the shaft 1. This will produce an initial tendency of the movable sealing member 11 to cock slightly with respect to the anchoring member 7 and as rotation takes place this cocking will tend to gyrate about the axis of the shaft 1. Experience indicates that when a different type of seal is used or when only a single O-ring is used for sealing between the parts 7 and 11, this cocking will be somewhat accentuated and instead of gyrating about the axis of the shaft 1 they tend to remain in one cocked position and cause excessive O-ring movement. Thereupon the O-ring or other type of seal between the parts shortly becomes incapable of performing it's sealing function. However, with the two axially spaced parallel O-rings as illustrated, the constant urging of these parts into realignment with one another counters the tendency just described and preserves the life of the O-rings.

As previously indicated, the friction between the sealing surfaces 13 and 14 as the shaft is rotated very rapidly generates a great deal of heat and causes a great rise in the temperature adjacent to these surfaces. In the case of the moving sealing member 11 the heat thus generated tends to travel through the member 11 and to cause high temperatures to exist as far away as the first seal ring. In the event of the use of another type of seal or of a single seal ring, this high degree of temperature causes rapid deterioration of the sealing material with the result that in a very short time the seal will degenerate and begin to leak.

With the seal arrangement employing the two parallel O-ring seals in accordance with this invention, and with the grooves, particularly the groove 17 closest to the primary sealing surfaces 13 and 14, being of a depth to extend a major portion of the thickness of the sleeve in which it is cut, this groove with the ring located therein provides a heat barrier that prevents the rapid transfer of heat to affect the seal ring 22 in the next groove. Strangely enough, it is indicated by experience that even the ring 21 will not degenerate as fast as if it were carrying the sealing burden alone, but in any event it helps to protect the ring 22 from the high degree of heat to which it would be subjected if it were the only O-ring at this location. Even if the ring 21 degenerates to the point that it begins to leak a little, it still serves as a heat barrier to prevent the heat from reaching the ring 22 and the ring 22 continues to be effective as a sealing member far beyond the life that it would enjoy if it were the sole sealing member at this point.

From the foregoing it will be seen that a means has been provided which brings about the result of preserving the life of the secondary seals many times longer than the useful life of such seals would be if each were made up of a single O-ring. Furthermore, this is done by the simple expedient of providing two O-rings instead of one at each secondary sealing location.

It should be noted that in the arrangement illustrated in the drawings the rotor 6 will be located in the zone containing the higher pressure which is to be sealed off by the sealing arrangement described, and that this pressure would exist between the end surface of the movable sealing member most remote from the primary sealing surface thereof, and the adjacent shoulder on the anchoring member 7, with the result that this pressure will be added to the force of the springs 24 in urging the movable sealing member into sealing engagement with the fixed sealing member 2. Furthermore, inasmuch as the material thus held under pressure is frequently of a corrosive nature, the seals 21 and 22 prevent the materials so held under pressure from seeping between members 7 and 11 into contact with the springs 24, which are normally very subject to corrosion. Likewise, the O-rings 19 and 20 are so located as to prevent such material under pressure from seeping between the outer surface of the shaft 1 and the inner surface of the anchoring member 7 into a position where it could adversely affect the springs 24. Thus the springs 24 are protected at all times against contact with the material being sealed against and against corrosion thereby if such material happens to be corrosive as is frequently the case.

It is thus apparent that means has been provided for carrying out all of the objects and advantages sought by this invention.

I claim:

1. In a mechanical seal assembly for sealing a rotating shaft with respect to a housing wall through which such shaft extends, with a stationary primary sealing member carried by such wall and surrounding such shaft in use and having a primary sealing surface in a plane radial relative to the shaft axis when so mounted, said assembly comprising a rotatable axially movable sealing member for surrounding such shaft and having a plane primary sealing surface in a plane radial relative to its own axis sealingly engageable with said primary sealing surface on the stationary sealing member, an anchoring member rigidly securable about such shaft in use and telescopingly engaged by said rotatable sealing member, means interlocking said anchoring member and said rotatable sealing member for limited relative axial non-rotative movement, whereby when said anchoring member is rigidly secured to such shaft said rotatable sealing member will be maintained in a constant phase relation with said shaft but will be free for limited axial movement along the shaft, means between said anchoring member and said rotatable sealing member resiliently urging said rotatable sealing member into primary sealing engagement with the stationary sealing member, and separate secondary sealing means between said anchoring member and each of the shaft and the rotatable sealing member, the improvement comprising said secondary sealing means between the anchoring member and the rotatable sealing member being comprised of a pair of axially spaced O-rings, the portion of said rotatable sealing member which is engaged by said O-rings being in the form of a sleeve, and the one of said O-rings, which is closest to the primary sealing surface of said rotatable sealing member, being mounted in a groove in said sleeve, which groove is of a depth constituting a major portion of thickness of said sleeve, whereby said last mentioned groove and seal ring will constitute a heat barrier between said primary sealing surface and the second of said O-rings between said anchoring member and said rotatable sealing member.

* * * * *